J. PEREPELKIN.
INDICATION TRANSMITTING APPARATUS.
APPLICATION FILED FEB. 23, 1912. RENEWED JULY 7, 1917.
1,236,976. Patented Aug. 14, 1917.
5 SHEETS—SHEET 3.
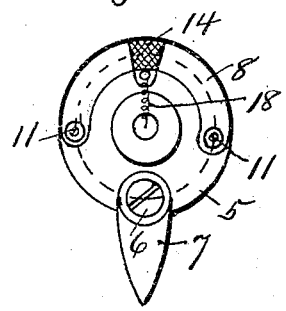
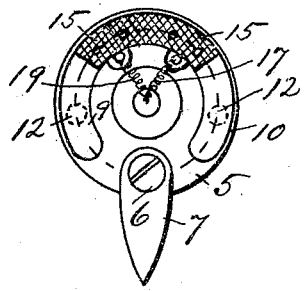
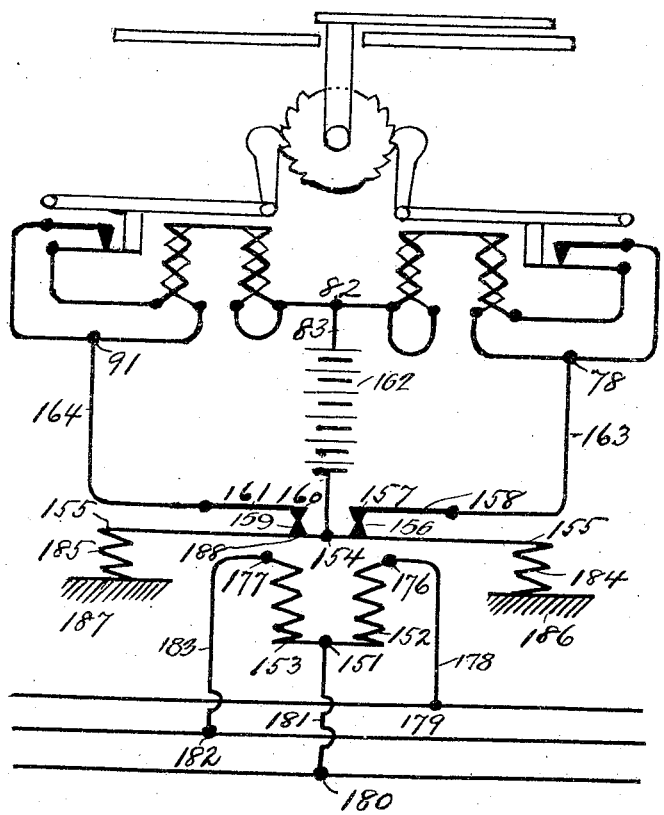

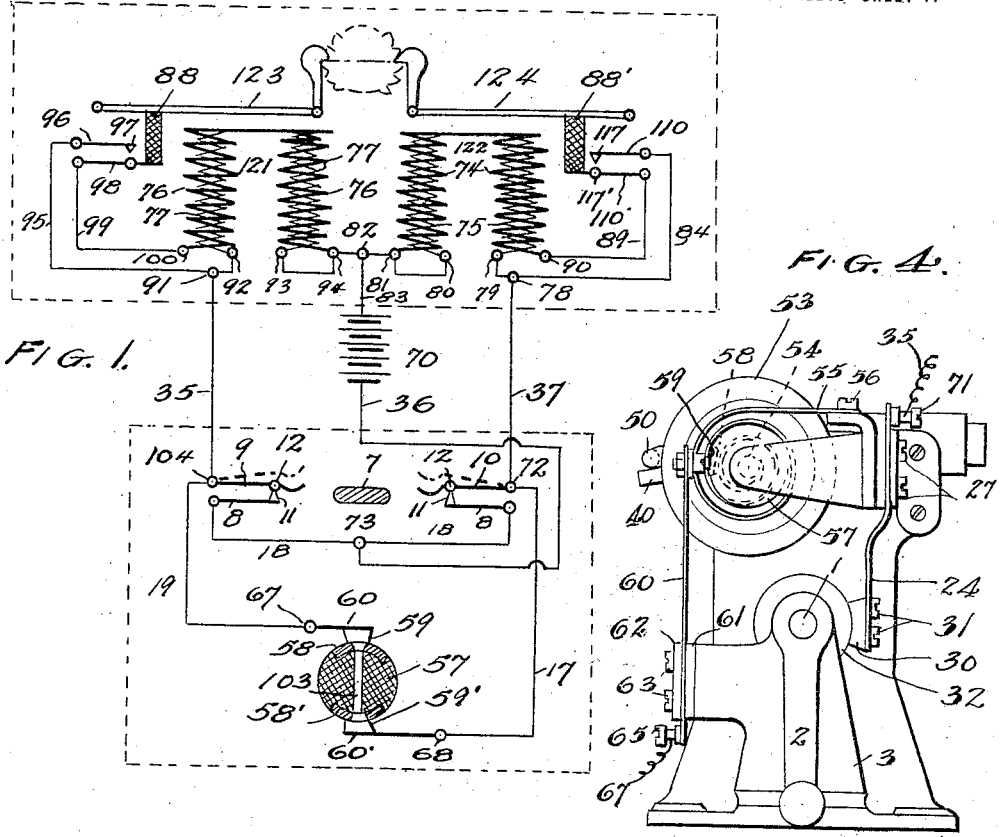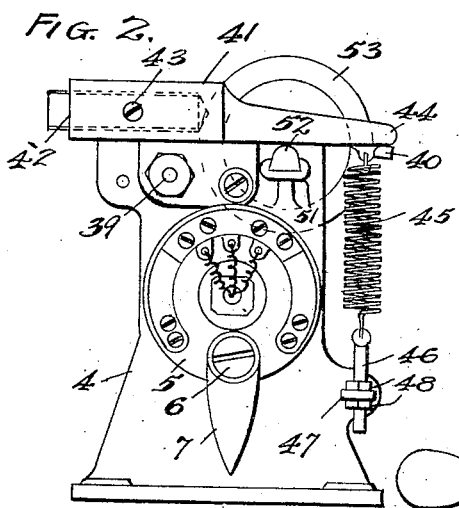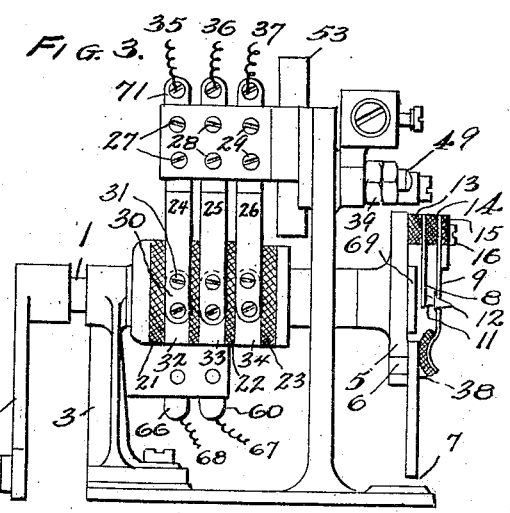

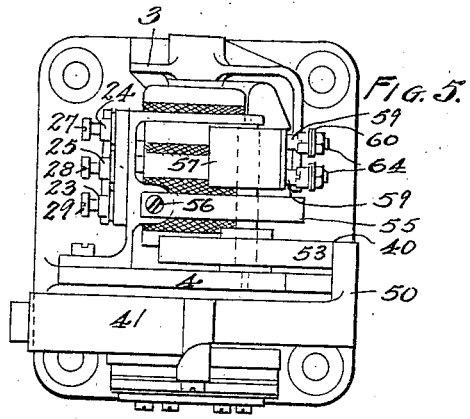
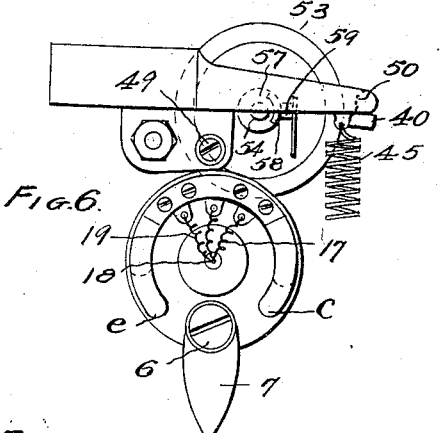
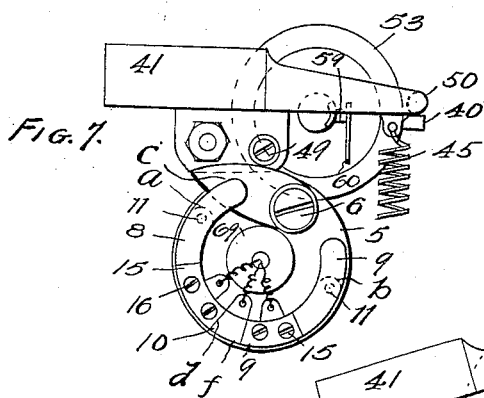
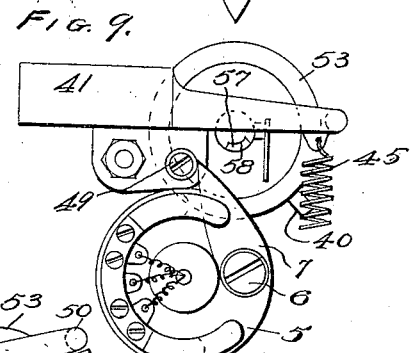
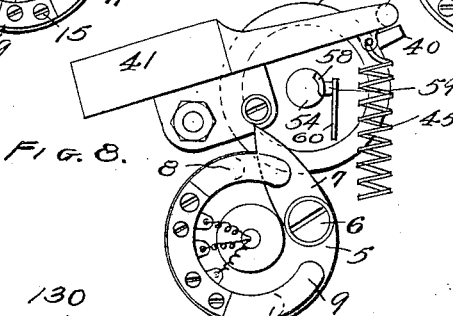
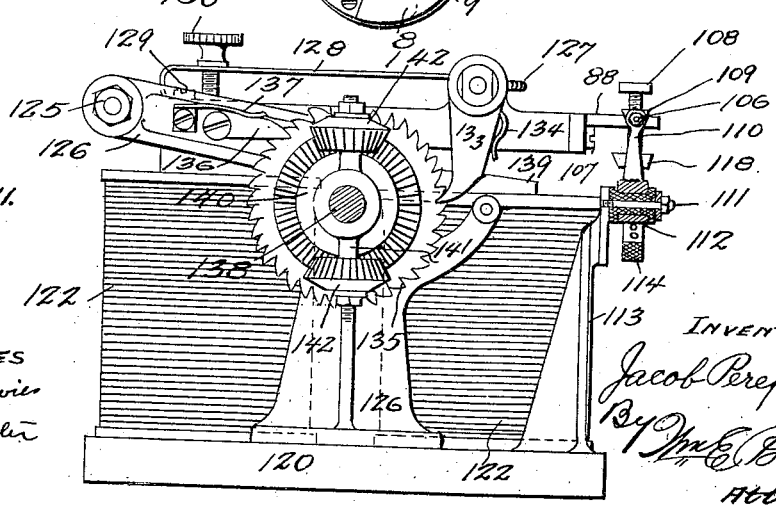

J. PEREPELKIN.
INDICATION TRANSMITTING APPARATUS.
APPLICATION FILED FEB. 23, 1912. RENEWED JULY 7, 1917.
1,236,976.
Patented Aug. 14, 1917.
5 SHEETS—SHEET 4.
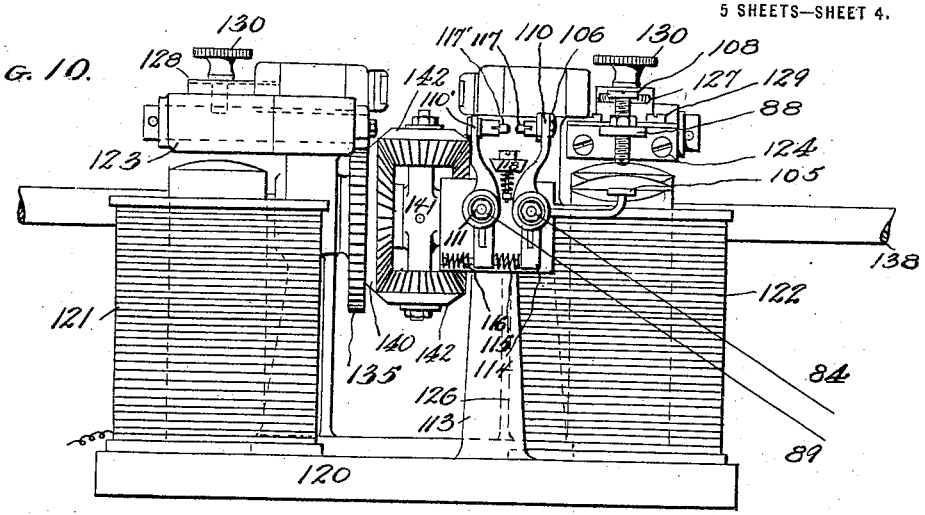
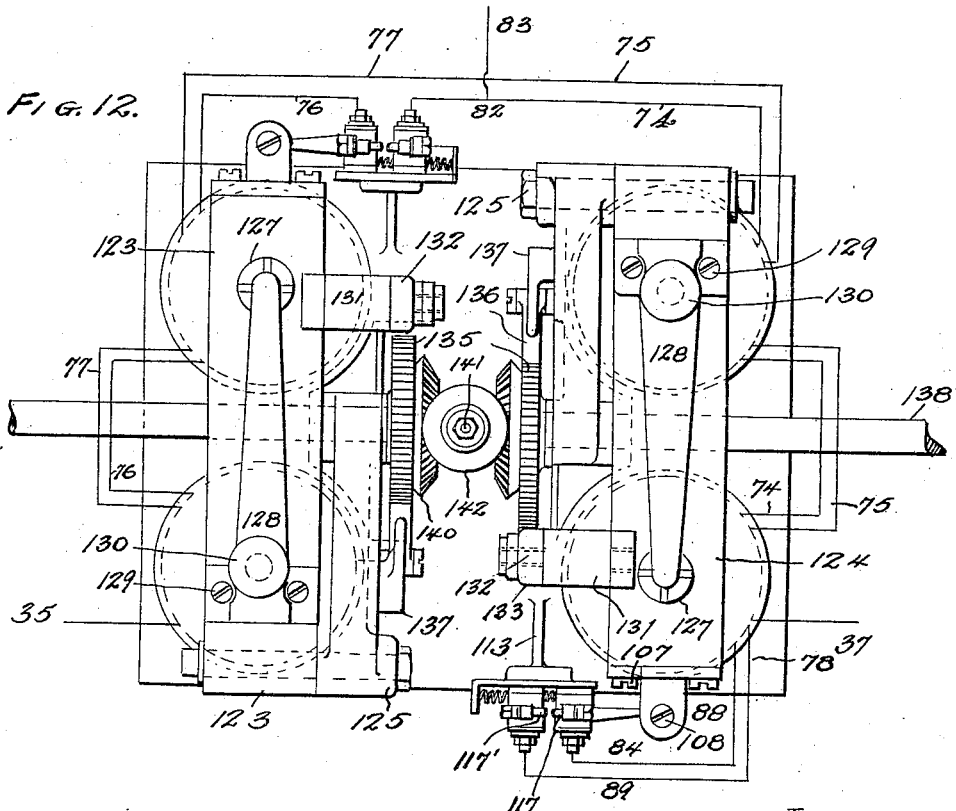
WITNESSES
C. K. Davis
H. K. Brown
INVENTOR
Jacob Perepelkin
By Wm. E. Boulter
Attorney

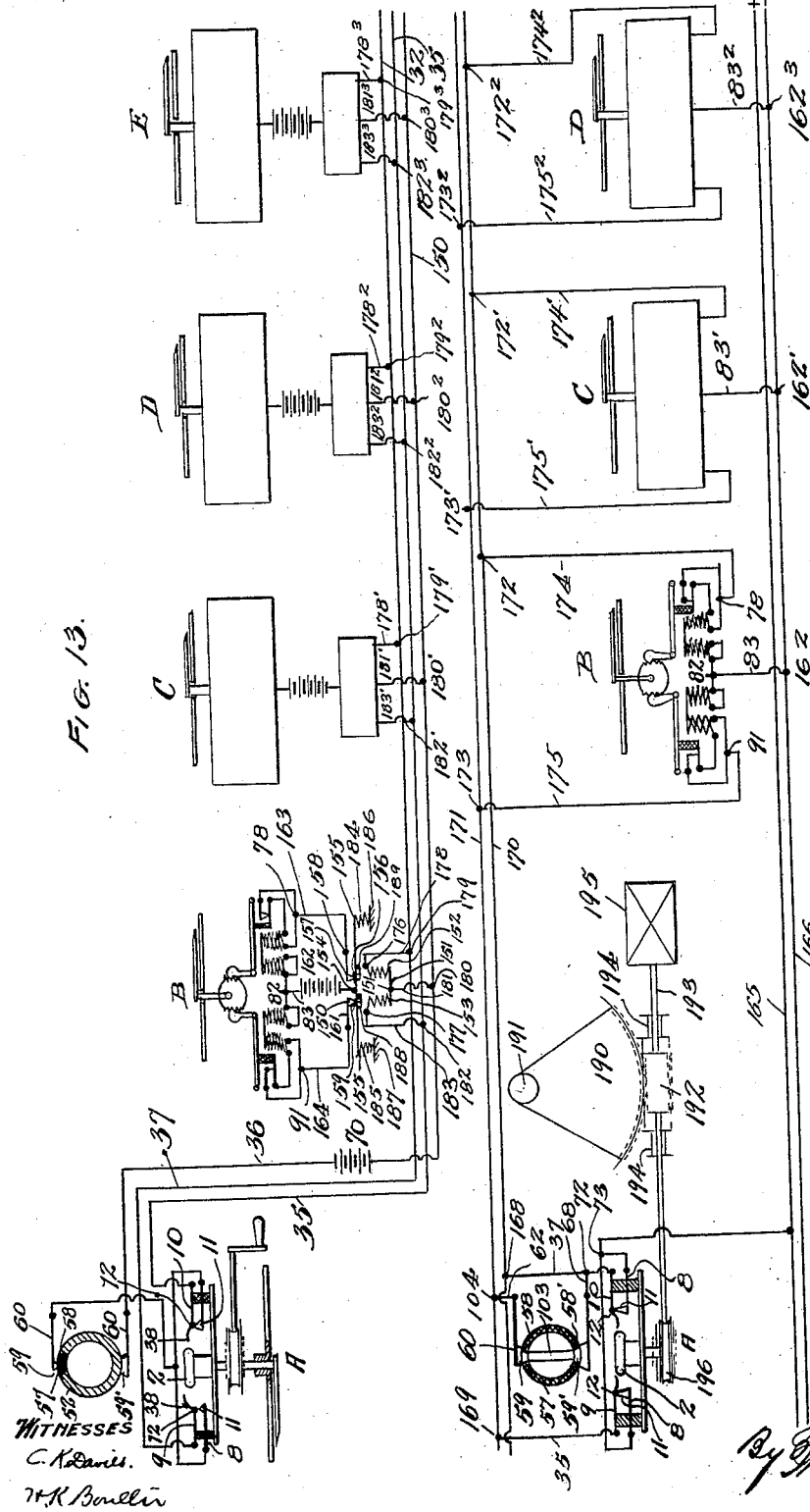

UNITED STATES PATENT OFFICE.

JACOB PEREPELKIN, OF PETROGRAD, RUSSIA.

INDICATION-TRANSMITTING APPARATUS.

1,236,976.  Specification of Letters Patent.  Patented Aug. 14, 1917.

Application filed February 23, 1912, Serial No. 679,360½. Renewed July 7, 1917. Serial No. 179,238.

*To all whom it may concern:*

Be it known that I, JACOB PEREPELKIN, a subject of the Emperor of Russia, and a resident of Petrograd, Russia, have invented certain new and useful Improvements in Indication - Transmitting Apparatus, of which the following is a specification.

This invention relates to apparatus for transmitting to a distance indications of the operative positions assumed by various devices, for example positions assumed from time to time by a ship's rudder, and which apparatus is of the kind comprising a transmitting device and one or more receiving devices.

It consists in improved construction and arrangement of parts, the principal object of which is that the finger or indicator of a receiver shall not be caused to indicate falsely by reason of casual vibrations or shocks, that is to say, the reading by the indicator at the receiver should be changed only when caused to be so by the operation of the transmitter.

To this end, means are provided whereby the shaft of the electro-magnetic motor employed at the receiving apparatus for moving the indicator thereof, is unable to turn during casual vibrations unless it is actuated by means under the control of the transmitter.

According to this invention, the coils of the electro-magnets constituting parts of the motor are arranged to be always under the influence of an electric current with their armatures attracted and consequently the circuits of the coils closed until such time as a key of the transmitter is turned in one or other direction so that one or other of the said circuits is opened. The object of this arrangement is that the motor shaft may be retained in a locked position as long as the said circuits are closed and the armatures attracted. It is also arranged that this period of open circuit shall be as small as possible and be adjustable for the proper operation of the mechanism, and that the reading indicated at the receiving device should change to the extent of only one division on the graduated dial associated with the receiver indicator, when the key shaft at the transmitter makes a full rotation in either direction independently of any casual position it may have. The parts of the transmitting and receiving apparatus are constructed and arranged to operate in a manner that the above objects may be attained.

In order that the coils of the electro-magnetic motor may not be of large dimensions, it is arranged according to this invention, that their windings should be fed, when the associated armatures are in the normal attracted position, with the weakest possible current, while, after an armature has been withdrawn and the motor shaft is to be turned in consequence of the attraction of the armature to operate the indicating mechanism of the receiving apparatus, the windings should be fed with a powerful current. For this purpose each coil may consist of two windings, one of which only is brought into circuit periodically after a circuit has been broken by the operation of the transmitter key and the armature corresponding with that circuit is to be again attracted and the motor shaft, through pawl and ratchet mechanism, turned.

On the accompanying drawings, Figure 1 represents diagrammatically the connections between a manually operated transmitting device and a receiving device; Figs. 2, 3, and 4 show elevations, and Fig. 5 a plan view of the transmitting device; Figs. 6, 7, 8 and 9 show various positions assumed by parts of the mechanism correlated with the key or controller of the transmitter during one turn of its axle; Figs. 6ª and 6ᵇ are views of the key or controller and of parts associated therewith; Figs. 10, 11 and 12 show various views of the electro-magnetic motor of the receiver; Fig. 13 represents a diagram of the connection of a transmitting device A with several receiving devices B, C, D and E; Fig. 13ª shows a portion of Fig. 13 drawn to an enlarged scale and Fig. 14 is a diagram representing the automatic transmission to a distance of indications of the position of an operated device, a rudder for example.

The key or controlling member of the transmitting device comprises the hollow shaft 1 (Figs. 3 and 4) which can rotate in the bearings of the brackets 3 and 4. A handle 2 may be set on the left end of it, or this shaft may be connected by means of a suitable mechanical transmission, with the operated device, the indications of the positions assumed by which have to be automatically transmitted a certain distance away.

A disk 5 (Figs. 2 and 3) is fastened on the right end of the shaft 1, which disk has on it a small cam 7, oscillating freely on the axle 6; a spring strip 8, between the points *a* and *b* (Fig. 7), insulated from the disk; two spring strips 9 and 10 between the points *e* and *f* and the points *c* and *d* respectively. These spring strips are insulated from one another and from the disk 5 with insulating packing 13, 14 and 15 (Figs. 3, 6ª and 6ᵇ) and fastened to the disk with insulating screws 16. Wires 17, 18 and 19 from each of these strips (Figs. 6, 6ª, 6ᵇ and 7) respectively run to rings 32, 33 and 34 (Fig. 3), fastened on the shaft 1 and insulated from the shaft, as well as from one another by means of the rings 20, 21, 22 and 23. Through rubbing contacts 30 (Figs. 3 and 4) and spring blades 24, 25, 26, the rings 32, 33 and 34 are connected with the clamps 71 from which the wires 35, 36 and 37 run. The springs 24, 25 and 26 are insulated from one another and from the key body, to which they are fastened by means of insulated screws 27, 28 and 29.

The free ends of the spring strips 9 and 10 carry an insulated part 38 (Fig. 3). The strips 9 and 10 are adapted to be electrically connected with the strip 8 through the contacts 11 carried by strip 8 and contacts 12 carried by strips 9 and 10, as shown in Figs. 3, 6ª and 6ᵇ, and 7.

On the rotation of the shaft 1, the cam 7 enters the space between the strips 8 and 9 or between the strips 10 and 8, dependent on the direction of the rotation of the key or handle 2. In the drawings rotation is assumed to be in the direction of the hands of a clock. The roller 49 (Figs. 3 and 6) will force the cam to occupy the position shown in Fig. 7. At the same time the plate 10 will bear on the cam with its insulated part 38, which part the cam will move outward and disconnect its contact 12 from the contact 11 of the plate 8.

A lever 41, fastened on the key body and having a weight on its left end, adjustably held by a screw 43, can oscillate freely on the axle 39 (Fig. 2). The other end 44 of the lever is drawn downward by a spring 45, adjustable by a screw 46, passing through the lug 47 of the key body, and nuts 48. The abutment 51 provided with the insulated rubber piece 52, limits the movement of the lever 41.

In upper bearings of the key body is an axle 54 (Fig. 4), to which is fastened by one of its ends a spiral spring 55; the other end of the spring is fastened with the screw 56 to the key body. The spring 55 is mounted in a somewhat wound state, dependent on the required adjustment of the transmitter and thus always tends to turn the axle 54 with the small fly wheel 53, while a small cam or tappet 40 carried by the wheel 53 has a tendency to move upward against the pin 50 of lever 41. A drum 57 (Figs. 4, 5 and 6), made of insulating material, is also fastened on the axle 54; it carries a metallic plate or segment 58. Rubbing contact brushes 59 59' bear on the surface of the drum 57, said brushes being adjustable by means of screws 64 (in Fig. 1 to make the matter more clear, two plates 58 and 58' are shown, connected by a pin 103) on springs 60 60', fastened, through insulating plates 61 and 62 and screws 63, to the body of the transmitter (Fig. 4).

The screws 65 serve as clamps for the wires 67 and 68. The wires 67—68 (Fig. 1) are connected with the wires 35 and 37 (Figs. 1 and 3), which are in their turn connected with the wires 19 and 17 from the plates 9 and 10 (Figs. 1, 6 and 7). The wire 36 is connected with the wire 18 from the plate 8.

In Fig. 1 it is seen, that the wires 35 and 37 run to the windings of the coils of the electro-magnetic motor of the receiving apparatus. The wire 36, runs through the source of electricity 70 to the common wire 82 which connects the other ends of the same windings.

The shaft of the hereinafter described electro-magnetic motor is connected with the finger or some other indicator of the receiving apparatus. It is extremely important, that the indications of the receiving apparatus should not be wrongly indicated during casual vibrations; to obviate this it is necessary that the shaft of the motor of the receiver should not be able to turn during casual vibrations unless it is actuated by the transmitting device. It is necessary for this purpose, that the coils of the electro-magnets should always be under the influence of an electric current and that their armatures should always be attracted.

Therefore the transmitter key must be arranged in such a way, that independently of the casual position of the shaft 1, the circuit of the coils of the electro-magnets of the receiving motor should always be closed. At the same time, on the rotation of the key axle 1, dependent on the direction of rotation, the circuit must be cut off in the right or left windings of the motor, *i. e.*, in wires 35 or 37. The stoppage of the current must be as short a period as possible, just sufficient for the armature of the corresponding electro-magnet to have time to withdraw to its upper position and catch a tooth of the ratchet wheel with its pawl before the circuit is again closed. The third condition is that the locking and unlocking of the circuit should take place once only during a revolution of the shaft 1. In other words, it is necessary, that the reading of the receiving device should change to the extent of one division on its graduated dial as the shaft 1 makes one full revolution in either direction, independent of any casual position of it.

Fig. 1 corresponds to the position of the key shown in Fig. 6. The circuit of the right windings of the motor will be:—70—83—82—81—80—75—79—78—37—72—10—8—18—73—36—70.

The circuit of the left windings:—70—83—82—94—93—77—92—91—35—104—9—8—73—36—70.

The circuits of both the electro-magnets are closed, the armatures are attracted and the shaft of the motor is locked.

If a rotation of the axle 1 of the key be commenced, say in the direction of the movement of the hands of a clock, the disk 5 will also rotate with it. When the cam 7 comes up to the roller 49 (Fig. 7) this latter will force it to enter the space between the plates 10 and 8 which are insulated from the cam. The contact between the contacts 11—12 will become broken. The plate 10 will occupy the position shown in Fig. 1 in dotted lines. In this position the course of the current of the left circuit will be the same as before and in the right one it will be as follows:—70—83—82—81—80—75—79—78—37—72—17—68—60'—59'—58'—103—58—59—60—67—19—104—9—8—18—73—36—70.

As before, the right circuit will be closed, but not through plates 10—8, as previously, but through the brushes 59 and the contact plate 58.

On a further rotation of the key axle the position shown in Fig. 8 will be attained. The cam 7 enters the space between the plates 10—8 only to such an extent, as the projecting part 69 of the disk 5 will allow. On the rotation of the disk 5 the cam 7, abutting against the roller 49, mounted on the lever 41, will commence to raise this latter. The fly wheel 53, under the influence of the spiral spring 55, follows the finger 50 on the lever 41 with its cam 40. In Fig. 8 is shown the extreme position of the lever 41, just before the moment when the end of the cam 7, on the further rotation of the axle 1, frees itself from the roller 49. Up to that moment the right circuit is still closed, the plate 58 and brushes 59 are still just in contact. As soon as the end of the cam 7 is free of the roller 49 (Fig. 9) the spring 45 will at once rapidly lower the lever 41, which will, with its finger 50, strike the tappet 40, whereupon the flywheel 53 together with its axle 54 and drum 57 will turn in consequence of the blow received by it, to the extent of a certain angle, which depends from the adjustment of the spiral spring 55, spring 45, weight of the parts, etc. At the same time, the current between the brushes 59 and the plate 58 (Fig. 1) will be cut off and therefore the current in the right circuit will also become cut off; whereupon the right armature of the hereinafter described electro-magnetic engine will be withdrawn and will catch a tooth of the ratchet wheel with its pawl. The left circuit, however, will remain closed all the time through the plates 8 and 9. The apparatus is adjusted in such a way, that when the flywheel 53 turns, as mentioned above, and, under the influence of the spiral spring, the axle 54 will occupy the position shown in Fig. 6 again, the contacts 59 and 59¹ will become closed, the right circuit will become closed, the right armature will be attracted and the shaft of the motor will turn to the extent of a corresponding angle. The next interruption of the current will occur only during the following full turn of the key axle. An altogether analogous occurrence will take place in the left circuit on the rotation of the key in the reverse direction.

It is seen from the aforesaid that the current in both circuits is only interrupted by the drum 57; the cam 7, however, dependent on the direction of rotation of the axle 1, causes the right or left electro-magnets of the receiving motor to be energized.

From the described arrangement and action of the key, it will be seen that:—(1) in the electro-magnetic motor the current is interrupted for a very short time, that can be adjusted for the proper working of the mechanism; (2) independent of the position of the key axle, the electro-magnets of the motor are always energized, and finally (3) the same uninterrupted relation or connection always exists between the number of revolutions and the direction of the rotation of the key axle, on the one hand, and the indications of the counting arrangement, on the other hand, when working.

The electro-magnetic motor of the receiving apparatus (Figs. 10, 11 and 12) is arranged in the following manner: two electro-magnets 121 and 122 with their armatures 123 and 124 are installed on a common iron base plate 120. The armatures turn on shafts 125 (Figs. 11 and 12), mounted on brackets 126, fastened on the base of the motor. Screws 127 (Fig. 10) serve as stops for limiting the upward movement of the armatures when the current in the electro-magnets is interrupted and the armatures are withdrawn under the influence of the springs 128. These springs are fastened at one end to the armatures with screws 129 (Fig. 12); with the other ends the springs coöperate with the limiting screws 127. The screws 130 (Figs. 11 and 12) serve to adjust the tension of the springs 128. The armatures 123, 124, have lugs 131 (Fig. 12) in which are fastened the axles 132 for the ratchet pawls 133 (Fig. 11), pressed by the springs 134. When the armature is attracted, its pawl moves the ratchet wheel 135 each time a distance of one tooth. Pawls 136 with springs 137 prevents the reverse movement of the ratchet wheels. In order that the ratchet wheel 135 should not skip over two or more teeth by reason of inertia, and especially when the force on the axle 138 of the motor tends to rotate it in the same direction, a pin 139 (Fig. 11) fastened to the stand 126, is provided. When the armature is attracted this pin does not allow the pawl 133 to withdraw from the ratchet wheel 135, and consequently this latter can turn at each attraction of the armature only a distance of one tooth. Bevel toothed wheels 140 are fastened to the ratchet wheels 135. The ratchet wheels 135 and wheels 140 are carried freely by an axle 138 mounted in bearings of the bracket 126 and are prevented from moving longitudinally by the flange of the bracket 126 on one side and the bushing of the transverse axle 141, connected with the axle 138, on the other.

Two small gear wheels 142 are mounted on the ends of the transverse axle 141 and each coupled with the two gear wheels 140, in a manner similar to that previously proposed for known signal transmitting and indicating apparatus.

As described above, on the rotation of the key axle 1 an opening or closing takes place in one or other of the circuits of the winding of the electro-magnets 121 or 122 and when one armature is retracted the other remains attracted. The pawl 133 of the retracted or working armature will turn its ratchet wheel each time a distance of one tooth and the bevel wheel 140, connected with it through a corresponding angle. The small bevel wheels 142 must rotate owing to this, but as the opposite bevel wheel 140, with its ratchet wheel, remains stationary the wheels 142 are therefore forced to roll over the stationary gear wheel 140, and the axle of the motor 138 will rotate.

The chief principle of the arrangement of the electro-magnetic motor described is, that at the time when the apparatus is operated, the electro-magnets must be energized or under current practically all the time, the current being interrupted only for the shortest possible time required for the proper action of the system. Therefore, in order to avoid the use of coils of large dimensions, the windings should be fed, at the time when the armatures are attracted, with the weakest possible current. It is necessary at the same time to give a motor a maximum power with the given dimensions and for this it is necessary to feed the windings of the electro-magnets with a powerful current, especially when the armature is in its extreme withdrawn position.

The construction of the electro-magnetic motor, described above, provides for these two extreme conditions in the following manner: Stands 113 are fastened to the base of the motor 120 (in Figs. 10 and 11 one stand only is shown and that for the right electric magnet; in practice a similar one would be provided for the left one). Axles 111 are fastened on them, on which levers 110, 110¹ are mounted having contacts 117, 117¹ on their upper heads, inserted in holders and regulated by means of screws with nuts 106. The lower ends of the levers 110, 110¹ have an insulation 114. The spring 115 forces the contacts 117, 117¹ to press upon each other and the spring 116 helps to control the movements of the levers.

The armatures have cams or arms 88 of insulated material, fastened to them with screws 107. The cams are provided with screws 108 adjusted by nuts 109.

Each coil of the electro-magnet consists of two windings; a thick one 74 or 76 (Fig. 1) and a thin one 75 and 77. As seen from Fig. 1, the thin windings are connected respectively with wires 35, 37 and 36 constantly. The thick windings, however, are only brought into circuit by means of levers 110. At the time when both the armatures are attracted (position shown in Fig. 1), the contacts 117 and 117¹, as well as 97 and 98, are open, as at that time the screws 108 of the armatures press on the branches 105 of the levers 110 and the abutments or stops 118, fastened to the armatures 123, 124, bear against and tend to separate the levers 110, 110¹, so that contacts 117 do not touch the contacts 117¹ and the thick windings of the electro-magnets are switched out. The electro-magnets 121 and 122 will be thus magnetized by a weak current in their windings; but such suffices as the distance between the cores of the magnets and the armatures will be a minimum one in this position and the electro-magnets will inherit sufficient power for holding the armatures in an attracted condition and for stopping or locking the axle 138 of the motor. At the same time the consumption of current and the heating of the winding will be minimized.

As soon as a breakage of either of the circuits takes place the corresponding armature will be withdrawn by its spring from the electro-magnet. On the subsequent closure of the circuit the current will pass into the thick, as well as the thin windings, as the contacts 117 and 117¹ will be in contact. The power of the electro-magnets will then be a maximum one (with the given conditions of construction) and the armatures will also be attracted with maximum power. Attracted by the cores of the electro-magnets, the armatures will cause the disconnection of the contacts 117 and 117¹ again and the thick windings will thereby be excluded from the circuit.

The whole system described may be used for direct current of any voltage. If the distances between the transmitting and receiving devices be large and if it be not desirable to have long lengths of wires under working current, it will be easy to connect the key of the transmitting device with relays installed at each receiving device. Then the transmitting device can work along with the relays of the receiving devices with a weak current and the relays can work with the motors of the receiving devices with the aid of local current of desired voltage.

The diagram shown in Fig. 13 (a part of which is shown in Fig. 13ª to a larger scale) shows such an arrangement, the same figures being used to show the different parts, as in Figs. 1 to 12. There are certain modifications, in this case, in the key of the transmitting device as compared with diagram shown in Fig. 1, which are as follows:—The drum 57 in Fig. 1 must be of insulated material; in Fig. 13 it is of metal, but insulated on its axle. In Fig. 1 the bushings 58 are of metal; according to Fig. 13 one bushing 58 is required, but it is to be made of insulating material. According to the diagram in Fig. 1 it is necessary, that the plates 9 and 10 should be in contact with the plate 8, when the key is not operated or working and should be disconnected by the cam 7, dependent on the direction of rotation of the key axle. According to the diagram 13 the cam 7 must be located outside the plates and, dependent on the direction of rotation, must press the plate 9 or 10 to the plate 8. According to the diagram Fig. 13, three wires 35, 37 and 150 run from the device A. The receiving devices are connected in parallel by means of wires 178, 181 and 183. The circuit is fed with current of low voltage but is usually without any current.

The wires 178, 181 and 183 connect with the clamps 176, 151 and 177 (Figs. 13 and 13ª) respectively on the relay. The armatures of the relays 188 and 186 are fastened to the plate 155 rotating about the axle 154 and held in proper position, as shown in Fig. 13 by the springs 184 and 185, abutting against the rigid parts of the relays 186 and 187. The plate 155 has contacts 156 and 159, which touch the rigid but springy contacts 158 and 161. As it is easily seen from the diagram in Fig. 13, both the electro-magnets of the receiving device have their coils under current and the armatures attracted when there is no current in the circuit of the transmitting device (35—37—150). Dependent on the direction of rotation of the key of the transmitting device during the operation of the latter one of the coils of the relays 152 or 153 will become magnetized and the corresponding armature 189 or 188, will be attracted, in view of which fact one of the contacts 156—157 or 159—160 will be closed. The motor will then work exactly as has been described in connection with diagram Fig. 1.

Fig. 14 shows an example of the automatic transmission of indications to a distance, for instance the positions of a rudder. Of course, in this case also the system with relays may be applied, but in Fig. 14 a case is shown when the transmission from the transmitting device is effected along two wires, making use of an existing wiring, for instance for electric lighting (the current being supposed to be direct).

In Fig. 14, 191 represents the axle of a rudder and 190 a sector fastened to it, rotated by an endless screw 192, the axle of which rests on bearings 194 and is rotated by a motor 195 of some suitable kind. The other end of the axle 193 of this motor is connected directly or by means of a suitable mechanical transmission 196 to the axle 1 of the key A. The mechanical transmission must be calculated in such a way that the axle of the key should make one revolution corresponding to one graduation of the desired accuracy of the indication of the position of the rudder. The construction and arrangement of the key is the same, as described above and explained with reference to Fig. 1, only instead of the source of electricity 70 the wire 68 is connected with the wire 165 of the existing general net-work of wiring. Wires 35 and 37 run from the plates 9 and 10, which wires lead to the clamps 168, 169 on the wires 170, 171, to which are connected in parallel by means of clamps 172, 173, and wires 174, 175, clamps 78 and 91, shown in Fig. 1. The clamps 82, however, are connected with the wire 166 of the net-work of the existing wiring mentioned above.

The action of the transmitting device A and the receiving devices B, C, D, and E are altogether similar to that described above in connection with Fig. 1.

What I claim and desire to secure by Letters Patent is:

1. In an apparatus of the character described the combination of an electro-magnetic motor located at a receiving station, an indicator at said station operated by said motor and comprising two electro-magnets and their armatures for controlling the shaft of said motor, and means whereby when the said armatures are held in an attracted position to retain the shaft in a normally locked position the coils of the magnets are under the influence of the weakest possible current and means whereby when the shaft is to be turned by reason of the attraction of one of the said armatures from a retracted position the coil of the corresponding magnet which causes the retraction of the armature is influenced by a powerful current.

2. In apparatus of the character described the combination of an electro-magnetic motor located at a receiving station, an indicator at said station operated by said motor and comprising two electro-magnets and their armatures for controlling the shaft of said motor, means whereby when the said armatures are held in an attracted position to retain the shaft in a normally locked position the coils of the magnets are under the influence of the weakest possible current and means whereby when the shaft is to be turned by reason of the attraction of one of the said armatures from a retracted position the coil of the corresponding magnet which causes the retraction of the armature is influenced by a powerful current, a pawl carried by each armature, ratchet wheels loose on the motor shaft and engaged by said pawls, a bevel wheel carried by each ratchet wheel, bevel wheels mounted on a transverse shaft and engaged by the first-mentioned bevel wheels in the manner described, and connections between the bevel wheels on the transverse shaft and the motor shaft, all as and for the purposes specified.

3. In an apparatus of the character described the combination of an electro-magnetic motor located at a receiving station, two electro-magnets and their armatures for controlling the motor shaft, an indicator at said station operated by said motor, a transmitter device embodying a body portion, a rotatable shaft carried by the body portion, a disk on said shaft, a cam oscillatably mounted on the disk, three spring strips carried by the disk and insulated from each other and from the disk but being in electrical contact with each other, said contact being adapted to be broken by the cam in the manner described, rings insulatably mounted on the aforesaid rotatable shaft and insulated from each other, wires connecting said rings with the said strips, spring blades contacting with the said rings and being insulatably carried by the said body portion and also insulated from each other, a pivotally mounted lever on the body portion of the transmitter device, a weight carried at one end of the lever, a spring acting upon the other end of the lever to draw said end downwardly, a spring-actuated shaft, a fly-wheel thereon, a tappet on the fly-wheel and adapted to actuate the said pivotally mounted lever, a drum of insulating material on the spring-actuated shaft, a metallic plate on said drum, contact brushes bearing on the drum, spring plates carrying said contact brushes and insulatably carried by the aforesaid body portion, electrical connections between the last-mentioned spring plates and the windings of the electro-magnets of the motor, electrically-actuated means controlled by said transmitter device for retaining the shaft of the said motor in a normally locked position and said locking means being adapted to unlock the motor shaft on the transmission of an electric impulse and impart to the said motor shaft during one complete turn of the shaft of the transmitter a definite angular movement, substantially as described.

In testimony whereof I have signed my name to this specification in the presence of two subscribing witnesses.

JACOB PEREPELKIN.

Witnesses:
H. A. LOODAGUINE,
A. N. TSCHERALOFF.

Copies of this patent may be obtained for five cents each, by addressing the "Commissioner of Patents, Washington, D. C."